(12) United States Patent
Kojima et al.

(10) Patent No.: US 7,489,267 B2
(45) Date of Patent: Feb. 10, 2009

(54) RADAR APPARATUS

(75) Inventors: Tatsuya Kojima, Nishinomiya (JP); Takumi Fujikawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 11/826,800

(22) Filed: Jul. 18, 2007

(65) Prior Publication Data

US 2008/0030401 A1 Feb. 7, 2008

(30) Foreign Application Priority Data

Jul. 18, 2006 (JP) ............................. 2006-196224

(51) Int. Cl.
  *G01S 7/04* (2006.01)
  *G01S 13/00* (2006.01)
(52) U.S. Cl. ...................................... 342/185; 342/195
(58) Field of Classification Search ................. 342/185, 342/195
  See application file for complete search history.

(56) References Cited

U.S. PATENT DOCUMENTS

| | | | | |
|---|---|---|---|---|
| 3,810,174 | A * | 5/1974 | Heard et al. ................. | 342/185 |
| 4,220,969 | A * | 9/1980 | Nitadori ..................... | 342/185 |
| 4,383,258 | A * | 5/1983 | Morin ........................ | 342/185 |
| 4,833,475 | A * | 5/1989 | Pease et al. ................. | 342/185 |
| 4,845,501 | A * | 7/1989 | Pease et al. ................. | 342/185 |
| 5,867,121 | A * | 2/1999 | Erickson et al. ............. | 342/185 |
| 6,043,775 | A * | 3/2000 | Erickson et al. ............. | 342/185 |
| 6,211,814 | B1 * | 4/2001 | Benjamin et al. ........... | 342/185 |
| 6,441,775 | B1 * | 8/2002 | Fujikawa et al. ............ | 342/185 |
| 7,268,725 | B2 * | 9/2007 | Makkapati et al. .......... | 342/185 |
| 2008/0030401 | A1 * | 2/2008 | Kojima et al. ............... | 342/185 |

FOREIGN PATENT DOCUMENTS

| GB | 2440270 A | * | 1/2008 |
|---|---|---|---|
| JP | 2005091262 A | * | 4/2005 |

* cited by examiner

*Primary Examiner*—John B Sotomayor
(74) *Attorney, Agent, or Firm*—Birch, Stewart, Kolasch & Birch, LLP (57) ABSTRACT

A radar device is realized in which an object and extraneous waves such as radar interference or white noise are distinguished and displayed in different display forms. Subtraction Flag Generator 6 determines the time-wise continuity and the planar consecutiveness of target echo data. The time-wise continuity is an amount that indicates the extent to which significant echo data continued to be present at the same position, and is obtained from the echo data of a past predetermined number of sweep rotations. Planar consecutiveness indicates the extent to which significant echo data is present around target echo data, and is obtained by acquiring in a planar fashion echo data for each of predetermined amounts in a distance direction and a heading direction, centered around the target echo data. When Subtraction Flag Generator 6 detects that there is either of time-wise continuity and planar consecutiveness, Subtraction Flag Generator 6 attaches a subtraction flag "1". Subtraction Processor 9 sets a low attenuation amount for the data level when the subtraction flag is "1", and sets a fast attenuation amount when the subtraction flag is "0".

7 Claims, 7 Drawing Sheets

RADAR APPARATUS

CROSS REFERENCE OF RELATED APPLICATION

Japanese Patent Application Tokugan No.2006-196224 is hereby incorporated by reference.

FIELD OF THE INVENTION

The present invention relates to a radar apparatus that converts reception data of a polar coordinate system to image data of a rectangular coordinate system.

BACKGROUND ART

Conventionally, in a radar apparatus for detecting objects in all directions from one's own vessel, a reception signal of a polar coordinate system is obtained while rotating a radar antenna at a predetermined period. The radar device converts a reception signal of this polar coordinate system to image data of a rectangular coordinate system and writes the image data to an image memory, and at a predetermined timing reads out image data that has been stored in the image memory. In a display of the radar apparatus, display is performed with the emission intensity and color changed according to the data level of the read-out image data.

In this sort of radar apparatus, there is a display method in which during one revolution (referred to as one sweep rotation) of the radar antenna, the emission intensity or the like of the displayed data is gradually weakened.

For example, in JP 2000-65920A, a radar device is disclosed in which image data stored in an image memory is read out, and the data level is gradually reduced by subtracting from the data level by predetermined amounts at a time according to a subtraction period, and the image data is stored in a successively updated manner in the image memory.

Also, in JP 2004-354301A, a radar device is disclosed in which instead of the subtraction process indicated in JP 2000-65920A, the data level is reduced by multiplying by a coefficient that is less than one.

In conventional radar devices such as those described in JP 2000-65920A and JP 2004-354301A, the aforementioned display method in which the emission intensity is gradually weakened during one sweep rotation is used in order to more easily distinguish actually present fixed or moving objects from white noise, interference from a radar of another vessel, or rain.

However, in these conventional radar devices, with respect to devices that have the same data level as each other, their emission intensity weakens approximately the same amount. Therefore, for example, a high data level is temporarily detected due to radar interference, and if the data level is the same as that of an actual object, it is not possible to clearly distinguish the radar interference and the actual object. Also, when, for example, gain has been raised in order to display low level data of an object that is far away at a high brightness, the far away object certainly can be displayed at a high brightness, but the amount of white noise having about the same level also increases, so it becomes difficult to distinguish the object from the white noise.

SUMMARY OF THE INVENTION

Accordingly, it is an object of the present invention to provide a radar apparatus with which a user can easily distinguish an actually present object from extraneous waves such as white noise, by distinguishing the object from the extraneous waves and causing their respective emission intensity attenuation degrees to differ.

The invention provides a radar apparatus that includes a data receptor which is configured to sequentially receive reception data of a polar coordinate system obtained by rotation of a sweep; an image data storage which is configured to convert the reception data of the polar coordinate system to image data of a rectangular coordinate system, and to store the image data such that all of the image data is updated according to the reception data for each rotation of the sweep; a subtraction characteristic determinator which is configured to, based on at least one of the planar consecutiveness or the time-wise continuity of the points of reception data obtained by the data receptor, determine a subtraction characteristic with which a data level of the corresponding image data is reduced at each of a subtraction timing that is shorter than the period of one rotation of the sweep; an image data subtractor which is configured to, based on the subtraction characteristic, reduce the data level of the image data that has been written to the image data storage at each subtraction timing, and to store the updated image data in the image data storage; and a display which is configured to successively read out and display the image data that has been stored in the image data storage.

With this configuration, a ratio is set for each reception data point obtained by rotation of a sweep, based on judgment of one or both of planar consecutiveness and time-wise continuity, at which the data level of each reception data point is reduced at each subtraction timing. At this time, the data level of the image data based on the reception data is actually reduced. Here, the planar consecutiveness is determined according to the number of reception data points that are equal to or greater than a predetermined threshold value in a group of reception data points near a target reception data point in the distance direction and the heading direction. Also, the time-wise continuity is determined according to the number of reception data points that are equal to or greater than a predetermined threshold value in a group of reception data points at present and in a past predetermined amount of scanning, at the location of the target reception data point. In the case of an object that is actually present, planar consecutiveness and time-wise continuity are generally high. On the other hand, in the case of white noise or the like, the planar consecutiveness and the time-wise continuity are generally low. Using this fact, an object that is actually present is clearly distinguished from white noise or the like by setting a low subtraction ratio for that which has high planar consecutiveness and time-wise continuity such as an object, and setting a high subtraction ratio for that which has low planar consecutiveness and time-wise continuity such as noise.

Also, in the radar apparatus according to the invention, the subtraction characteristic determinator acquires the data level of a planar reception data point group comprising a region of a predetermined number of data points in a distance direction and a heading direction centered around a reception data point for which a subtraction characteristic is to be determined, and when the subtraction characteristic determinator detects, in the planar reception data point group, that a number of reception data points, having the data level being equal to or greater than a predetermined threshold value, is equal to or greater than a predetermined number of reception data points, the subtraction characteristic determinator sets a subtraction characteristic such that, with the reception data point for which a subtraction characteristic is to be determined having planar consecutiveness, the rate of change over time of the data level due to subtraction at each subtraction timing of the image data corresponding to the reception data is low.

With this configuration, judgment is performed specifically according to the planar consecutiveness. The subtraction characteristic determinator extracts a planar reception data point group comprising a predetermined number of reception data points in the distance direction and the heading direction centered around a reception data point for which a subtraction characteristic is to be determined. When the subtraction characteristic determinator detects, in the planar reception data point group, that a number of reception data points equal to or greater than the predetermined number of data points is equal to or greater than a predetermined threshold value, it is judged that the reception data subject to the determination has planar consecutiveness. When the subtraction characteristic determinator judges that there is planar consecutiveness in this manner, it sets a low subtraction ratio for the data level of the image data corresponding to the reception data.

Also, in the radar apparatus according to the invention, the subtraction characteristic determinator is provided with a past reception data storage that stores reception data for a past predetermined number of sweep rotations; and the subtraction characteristic determinator acquires the data level of a time-wise reception data point group including a reception data point for which a subtraction characteristic is to be determined and the reception data points of the past predetermined number of sweep rotations corresponding to the reception data point for which a subtraction characteristic is to be determined, and when the subtraction characteristic determinator detects, in the time-wise reception data point group, that a number of reception data points, having the data level being equal to or greater than a predetermined threshold value, is equal to or greater than a predetermined number of reception data points, the subtraction characteristic determinator sets a subtraction characteristic such that, with the reception data point for which a subtraction characteristic is to be determined having time-wise continuity, the rate of change over time of the data level due to subtraction at each subtraction timing of the image data corresponding to the reception data is low.

With this configuration, judgment is performed specifically according to the time-wise continuity. The subtraction characteristic determinator extracts a time-wise reception data point group comprising a reception data point for which a subtraction characteristic is to be determined and the reception data points of the past predetermined number of sweep rotations at the position of the reception data point for which a subtraction characteristic is to be determined. When the subtraction characteristic determinator detects, in the time-wise reception data point group, that a number of reception data points, having the data level being equal to or greater than a predetermined threshold value, is equal to or greater than a predetermined number of data points, it is judged that the reception data subject to the determination has time-wise continuity. When the subtraction characteristic determinator judges that there is timewise continuity in this manner, it sets a low subtraction ratio for the data level of the image data corresponding to the reception data.

Also, in the radar apparatus according to the invention, the subtraction characteristic determinator is provided with a past reception data storage that stores reception data for a past predetermined number of sweep rotations; and the subtraction characteristic determinator acquires the data level of a time-wise reception data point group including a reception data point for which a subtraction characteristic is to be determined and the reception data points of the past predetermined number of sweep rotations corresponding to the reception data point for which a subtraction characteristic is to be determined, and when the subtraction characteristic determinator detects, in the time-wise reception data point group, that a number of reception data points, having the data level being equal to or greater than a predetermined threshold value, is equal to or greater than a predetermined number of data points, or when the subtraction characteristic determinator detects, in the planar reception data point group, that a number of reception data points, having the data level being equal to or greater than a predetermined threshold value, is equal to or greater than a predetermined number of data points, the subtraction characteristic determinator sets a subtraction characteristic such that, with the reception data point for which a subtraction characteristic is to be determined having at least one of time-wise continuity and planar consecutiveness, the rate of change over time of the data level due to subtraction at each subtraction timing of the image data corresponding to the reception data is low.

With this configuration, a judgment is made with respect to both the aforementioned planar consecutiveness and time-wise continuity, and when judging that there is any one of planar consecutiveness and time-wise continuity, a low subtraction ratio is set for the data level of the image data corresponding to the reception data point for which the determination was made.

Also, in the radar apparatus according to the invention, the image data subtractor is provided with a subtraction characteristic such that the rate of change over time is high and a subtraction characteristic such that the rate of change over time is low, and the subtraction characteristic determinator, when the number of reception data points, having the data level being equal to or greater than a predetermined threshold value, is equal to or greater than a predetermined number of data points, causes the image data subtractor to select the subtraction characteristic such that the rate of change over time is low.

With this configuration, the image data subtractor employs a subtraction formula in which the subtraction ratio of the data level differs for each rate of change over time. In the image data subtractor, the subtraction characteristic is determined from the aforementioned planar consecutiveness and time-wise continuity. For example, with $\alpha<\beta$, when it is judged that there is planar consecutiveness or time-wise continuity, subtraction processing is performed using a subtraction formula with a low subtraction ratio ($Y_n=\alpha X_n$), and when it is judged that there is not planar consecutiveness or time-wise continuity, subtraction processing is performed using a subtraction formula with a high subtraction ratio ($Y_n=\beta X_n$). Thus, because there are only two easily distinguished types of subtraction processing, the computational processing load is lightened.

According to the invention, for example, the speed of light reduction differs between an object and extraneous waves such as radar interference or white noise, with the speed of light reduction being slower for the object than for the extraneous waves, so it possible to clearly distinguish the object from the extraneous waves.

BRIEF DESCRIPTION OF THE DRAWINGS

FIGS. 5A to 5D are concept diagrams of a case in which a subtraction flag has been determined using either of consecutiveness and continuity.

DESCRIPTION OF THE PREFERRED EMBODIMENTS

Following is a description of a radar device according to an embodiment of the present invention with reference to the accompanying drawings. In the present embodiment, a radar device is described by way of example, but the present embodiment is also applicable to a sonar device or the like that detects and displays an object.

Figure 1:
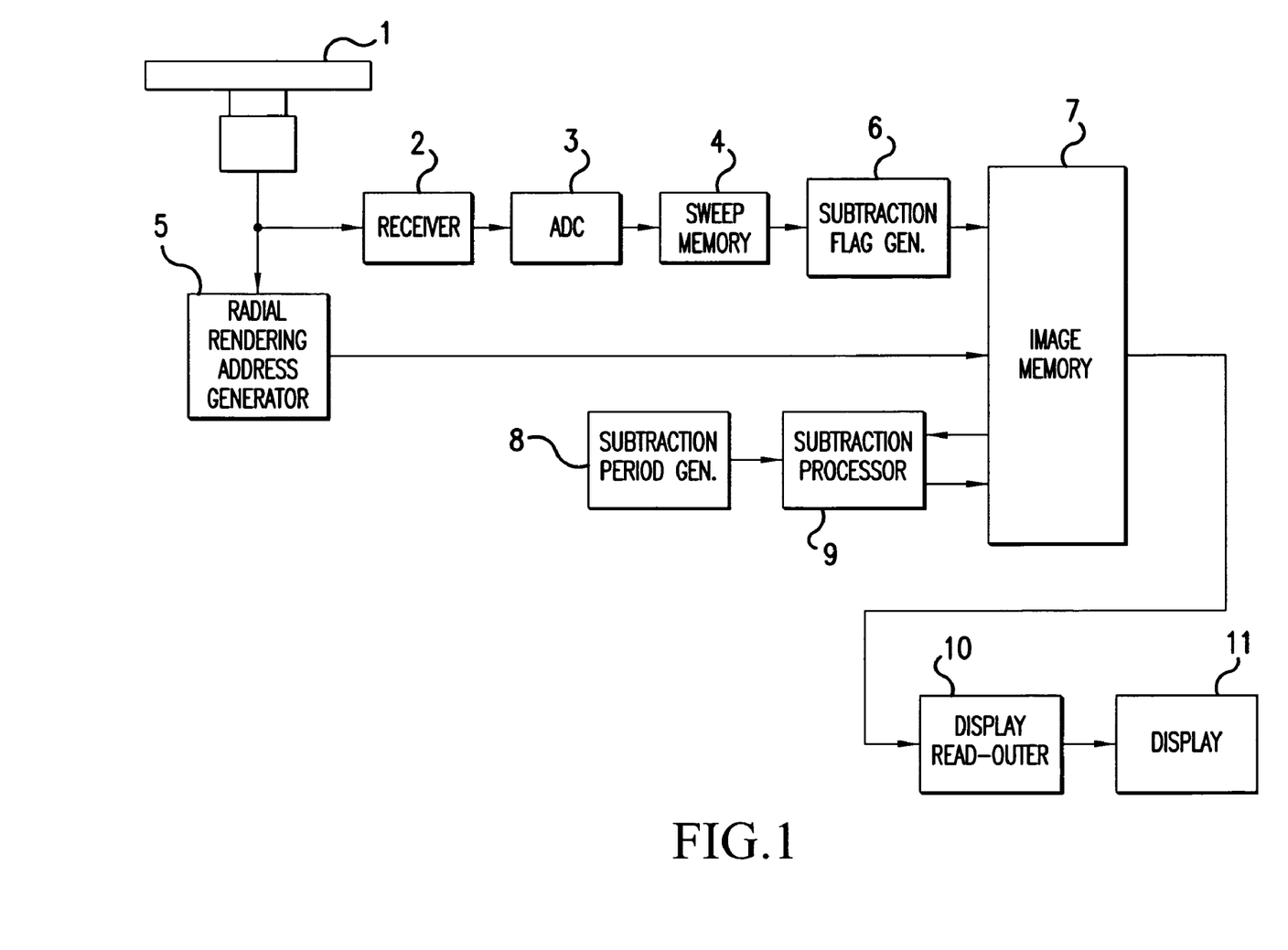
FIG. 1 is a block diagram that shows the principal configuration of a radar device according to an embodiment of the present invention.

FIG. 1 is a block diagram showing the principal configuration of a radar device according to this embodiment.

Radar Antenna 1 of the radar device according to this embodiment, while rotating at a predetermined rotation period in the horizontal plane, emits a pulse-shaped electromagnetic wave during a send-receive period that differs from the rotation period, and also receives, in a polar coordinate system, waves reflected by an object in the surrounding area of the radar device. The Radar Antenna 1 outputs a reception signal to Receiver 2, and outputs sweep angle data to Radial Rendering Address Generator 5.

Receiver 2 detects and amplifies the reception signal from Radar Antenna 1, and outputs the amplified signal to AD Converter 3. AD Converter 3 converts the analog reception signal to data composed of a plurality of bits (echo data).

Sweep Memory 4, into which the digitalized echo data of one sweep is stored in real time, outputs the echo data of this one sweep to Image Memory 7 via Subtraction Flag Generator 6, before the echo data obtained by the next transmission is written again.

Radial Rendering Address Generator 5 produces addresses specifying pixels in Image Memory 7 arranged in a corresponding rectangular coordinate system, from the antenna angle θ (taking a predetermined direction such as the forward direction of the vessel as a reference) and Read-out Position r of Sweep Memory 4, taking the sweep rotation center as the start address and going around from the center. Radial Rendering Address Generator 5 is specifically configured by hardware realizing the following equations:

$$X = Xs + r \cdot \sin \theta$$

$$Y = Ys + r \cdot \cos \theta$$

where X, Y: address specifying a pixel in Image Memory 7
Xs, Ys: center address of sweep
r: distance from center
θ: angle of sweep (antenna)

Figure 2:
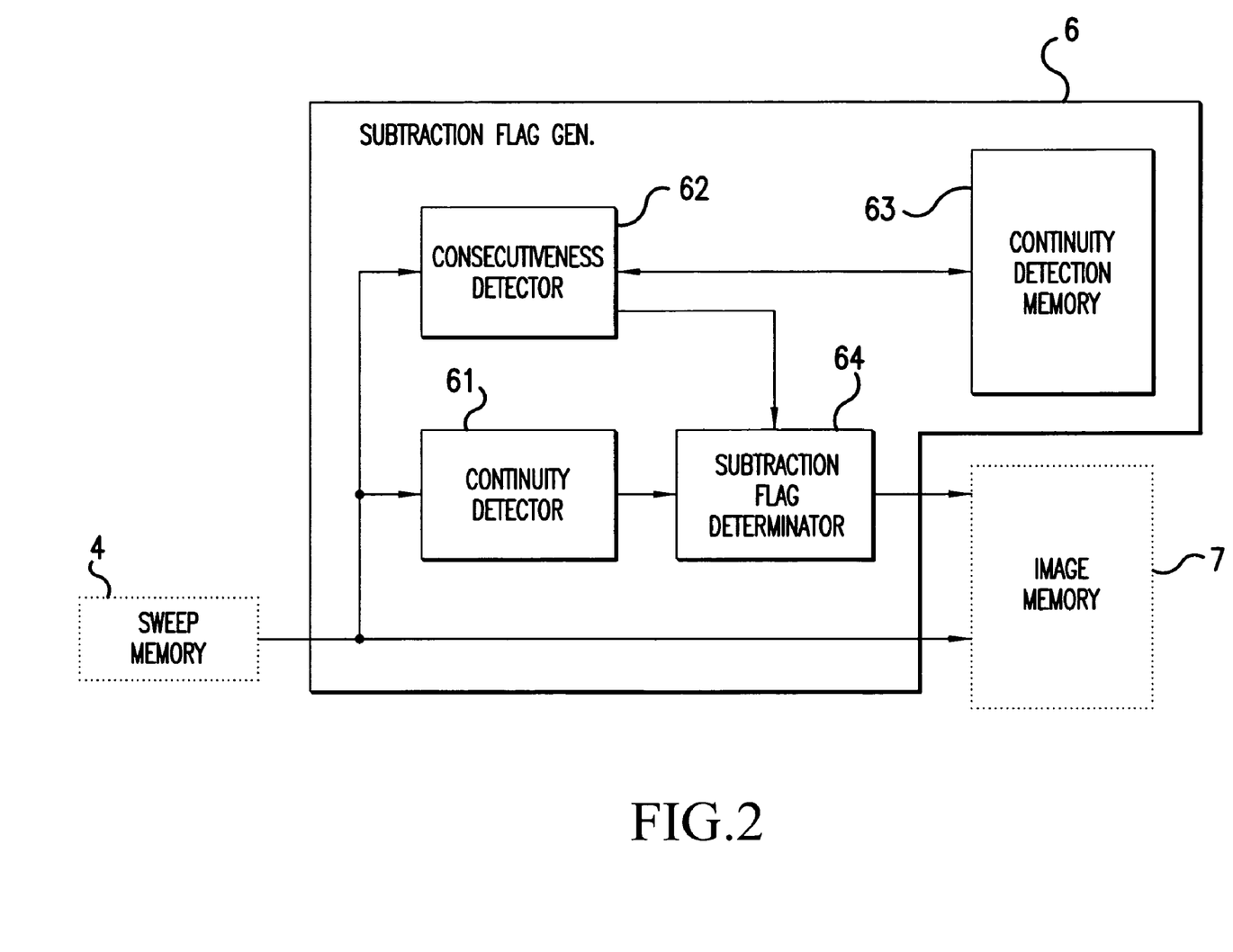
FIG. 2 is a block diagram that shows the principal configuration of Subtraction Flag Generator 6.

Subtraction Flag Generator 6 is configured as shown in FIG. 2.

FIG. 2 is a block diagram showing the principal configuration of Subtraction Flag Generator 6.

Subtraction Flag Generator 6 is provided with Consecutiveness Detector 61, Continuity Detector 62, Continuity Detection Memory 63, and Subtraction Flag Determinator 64.

Consecutiveness Detector 61 is provided with a buffer memory in which echo data that is input from Sweep Memory 4 is stored for predetermined headings, and detects the consecutiveness of the echo data subject to determination.

Figure 3A:
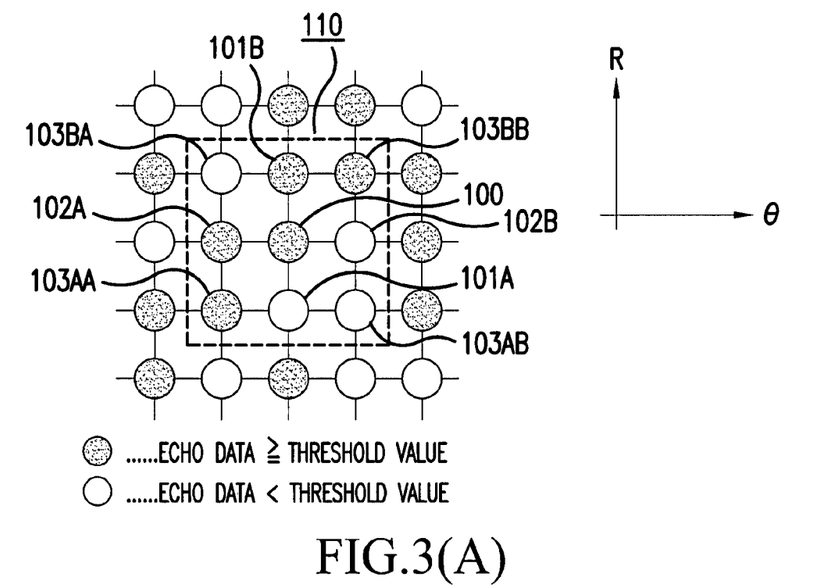
FIGS. 3A and 3B illustrate a concept of consecutiveness.
Figure 3B:
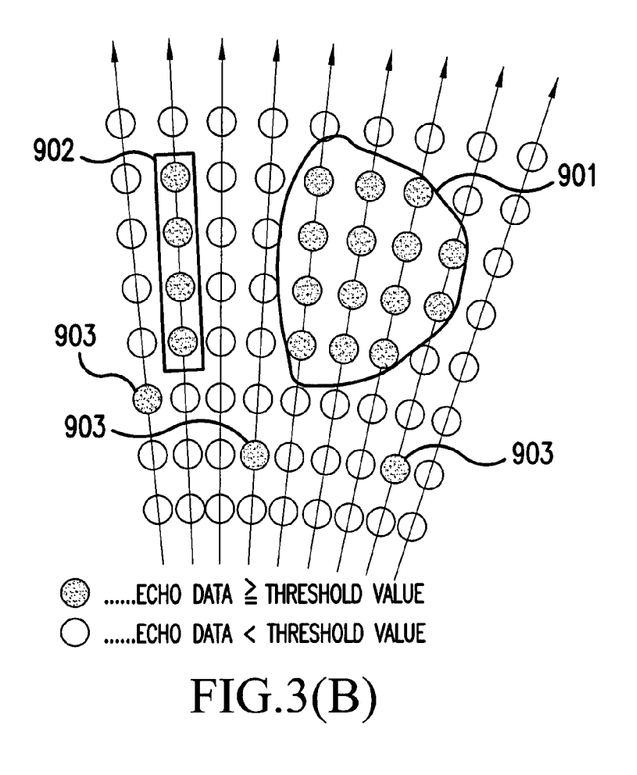

FIGS. 3A and 3B illustrate the concept of consecutiveness, with FIG. 3A illustrating the consecutiveness determination, and FIG. 3B illustrating an example of the consecutiveness determination for each object, interference, and white noise.

Consecutiveness Detector 61 extracts echo data present in Consecutiveness Determination Reference Region 110 that includes the echo data subject to the consecutiveness determination from a buffer memory. Here, Consecutiveness Determination Reference Region 110, for example, is a region that encompasses Echo Data Points 101A and 101B adjacent to Echo Data Point 100 that is subject to the determination in Distance Direction R, Echo Data Points 102A and 101B adjacent to Echo Data Point 100 in Heading Direction θ, and Echo Data Points 103AA, 103AB, 103BA, and 103BB adjacent to Echo Data Point 100 in four directions that Distance Direction R and Heading Direction θ intersect at 45° and extend.

Consecutiveness Detector 61 detects the data level of these Data Points 100, 101A, 101B, 102A, 102B, 103AA, 103AB, 103BA, and 103BB, and if the number of echo data points having a level equal to or greater than a detection threshold value that has been set in advance is equal to or greater than a determination threshold value that has likewise been set in advance, a determination is made that there is consecutiveness, and the data having consecutiveness is output to Subtraction Flag Determinator 64.

For example, as shown in FIG. 3B, with respect to Object 901, echo data points having a level equal to or greater than the detection threshold value gather together, so there are multiple points of echo data having a level equal to or greater than the detection threshold value present in Consecutiveness Determination Reference Region 110. On the other hand, at the edges (the peripheral portion) of the object, the number of echo data points having a level equal to or greater than the detection threshold value that is present in Consecutiveness Determination Reference Region 110 is about half the number of echo data points in the center. Also, in Interference 902, echo data points having a level equal to or greater than the predetermined threshold value are only present in the same heading direction, so the number of echo data points having a level equal to or greater than the detection threshold value that is present in Consecutiveness Determination Reference Region 110 is further reduced. Moreover, White Noise Points 903 often occur singly, so there is almost no echo data having a level equal to or greater than the detection threshold value that is present in Consecutiveness Determination Reference Region 110.

Accordingly, by setting the consecutiveness determination threshold value to for example, 60 to 70%, such that the number of echo data points having a level equal to or greater than the detection threshold value that is present in Consecutiveness Determination Reference Region 110 is greater than a simple majority of the number of echo data points within Consecutiveness Determination Reference Region 110, it is possible to reliably distinguish the object from interference and white noise. At this time, there is a possibility that the edges of the object will not be judged to have consecutiveness from the determination threshold value that is set.

Continuity Detector 62 detects whether or not the data level of each echo data point is equal to or greater than the detection threshold value. When the data level of the echo data point is equal to or greater than the detection threshold value, "1" is stored in Continuity Detection Memory 63 to indicate that the point is valid data, and when the data level of the echo data point is less than the detection threshold value, "0" is stored in Continuity Detection Memory 63 to indicate that the point is not valid data.

Data in Continuity Detection Memory 63 that has been judged to be valid or invalid in this manner is stored for a predetermined number of rotation times in a state associated with echo data addresses.

Figures 4A, 4B, 4C, 4D, 4E, 4F:
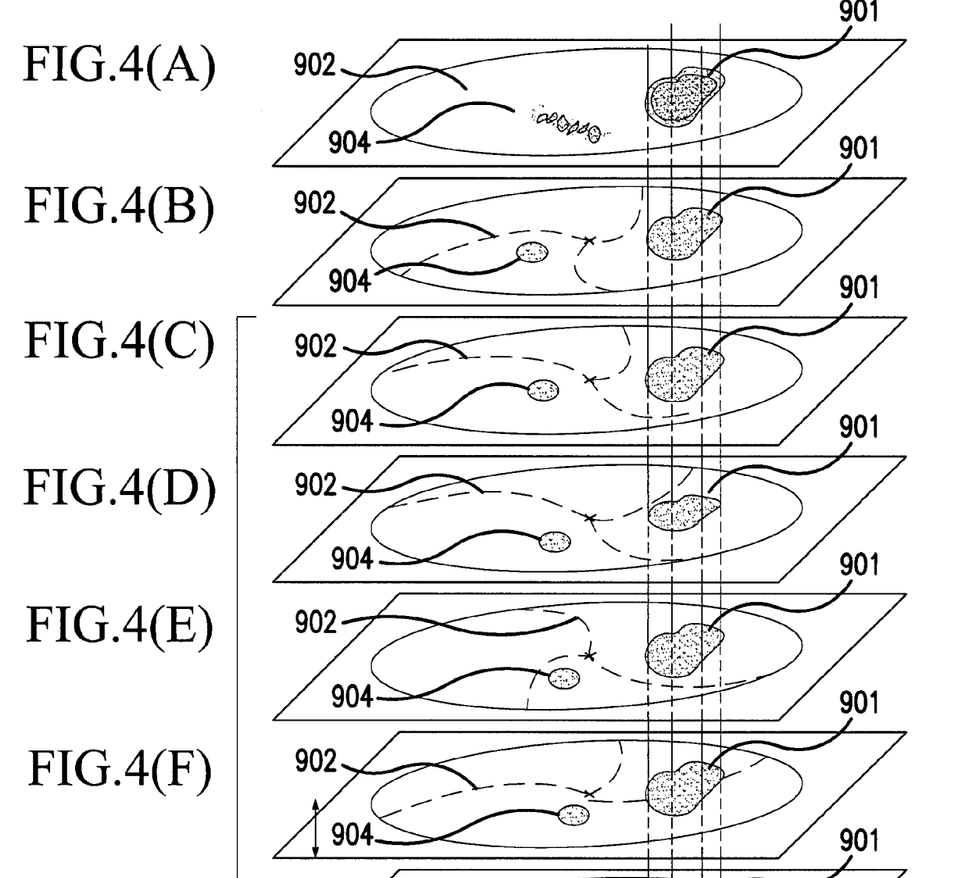
FIGS. 4A to 4I illustrate a concept of continuity.
Figures 4G, 4H, 4I:
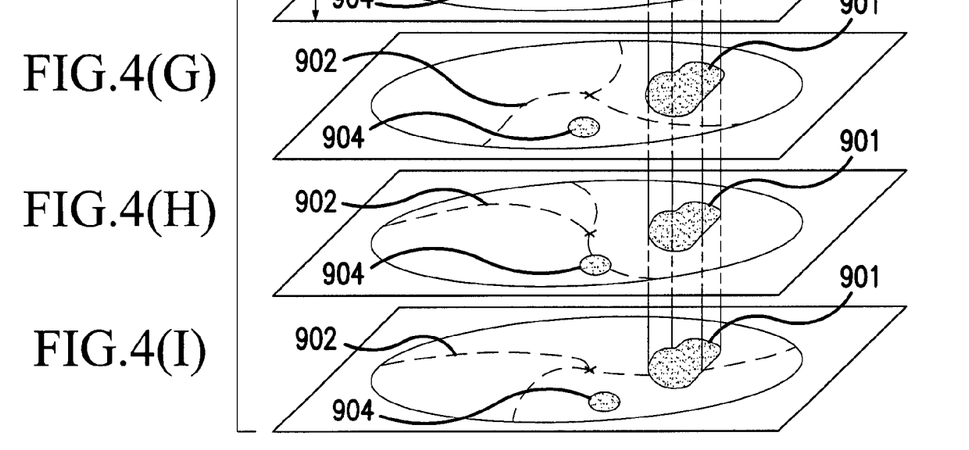

FIGS. 4A to 4I illustrate the concept of continuity. FIG. 4A shows the strength of continuity based on the determination results shown in FIGS. 4B to 4I, and FIGS. 4B to 4I show the valid/invalid data of past scans in the order of FIG. 4C to 4I with FIG. 4B being the present scan. In FIG. 4A, integrated values of the of the valid data are indicated by the shaded areas, and in FIGS. 4B to 4I, the colored portion indicates valid data and the non-colored portion indicates invalid data.

Continuity Detector 62 reads out the valid/invalid data of the same address as the presently-obtained echo data from Continuity Detection Memory 63, and if the number of valid data points is equal to or greater than the determination threshold value, judges that the corresponding echo data has continuity, and outputs the data having continuity to Subtraction Flag Determinator 64.

For example, as shown in FIGS. 4A to 4I, there is essentially no movement of Fixed Object 901 over time, so echo data is present in about the same position, and thus without distinguishing between the center and edge portions, nearly all of the data is valid in the past predetermined number of sweep rotations. Also, Interference 902 varies from moment to moment, so at a position corresponding to echo data that is presently equal to or greater than the detection threshold value, there is a low possibility that a plurality of valid data points will be present within the past predetermined number of sweep rotations. Also, White Noise Points 903 often occur singly, so at a position corresponding to echo data that is presently equal to or greater than the detection threshold value, there is almost no possibility that valid data points will be present within the past predetermined number of sweep rotations. Also, because Moving Object 904 moves with the passage of time, the number of valid data points increases in the order of leading portion, center portion, trailing portion. Thus, the number of valid data points within the past predetermined number of sweep rotations changes due to the movement speed of Moving Object 904, with the number of valid data points increasing in the center portion and the trailing portion, and the leading portion also having some number of valid data points.

Accordingly, by setting the consecutiveness determination threshold value to for example, 60 to 70%, such that the number of valid data points with the same address as the echo data subject to the determination is greater than a simple majority of the past predetermined number of sweep rotations, it is possible to reliably distinguish the fixed object and the moving object from interference and white noise.

Figures 5, 5A, 5B, 5D:
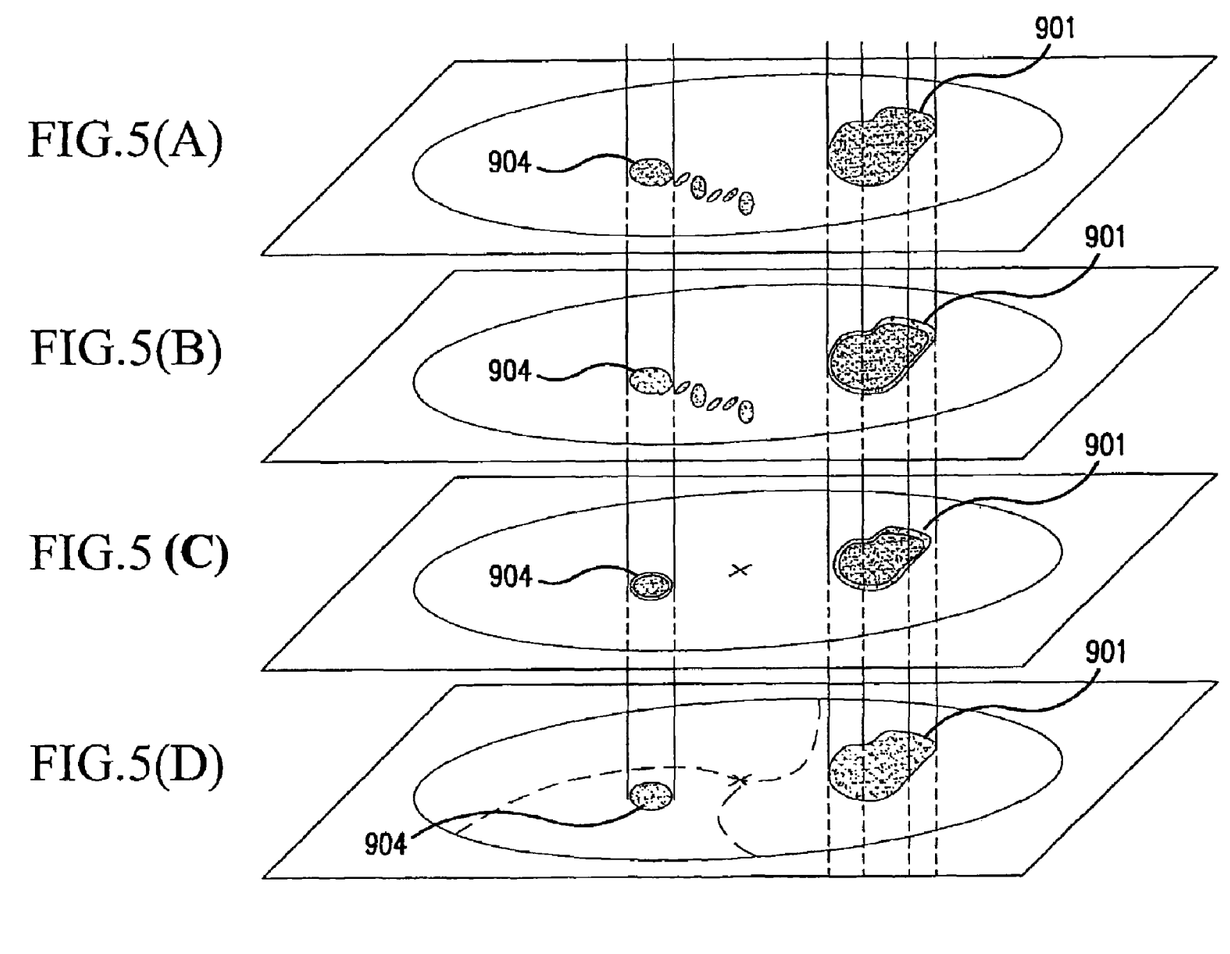

When Subtraction Flag Determinator 64 detects data having consecutiveness from Consecutiveness Detector 61, or data having continuity from Continuity Detector 62, Subtraction Flag Determinator 64 outputs a subtraction flag "1", and when Subtraction Flag Determinator 64 does not detect data having consecutiveness or data having continuity, Subtraction Flag Determinator 64 outputs a subtraction flag "0". At this time, Subtraction Flag Determinator 64 stores the subtraction flag in Image Memory 7 associated with the echo data subject to determination. FIGS. 5A to 5D are concept diagrams of a case in which a subtraction flag has been determined using either of consecutiveness and continuity. FIG. 5A shows the subtraction flag distribution, FIG. 5B shows the continuity distribution, FIG. 5C shows the consecutiveness distribution, and FIG. 5D shows the distribution of echo data that is presently equal to or greater than a threshold value.

Image Memory 7 stores echo data obtained in sweep rotation and an attenuation flag associated with each echo data point in pixels that have been arranged in a rectangular coordinate system, based on rectangular coordinates obtained from Radial Rendering Address Generator 5.

Subtraction Period Generator 8 sets a subtraction period, which designates the number of times to perform a subtraction process during the time span of one sweep rotation, by performing a process such as counting backward from the time span of one sweep rotation, and provides a subtraction trigger to Subtraction Processor 9 for each set period.

Figure 6:
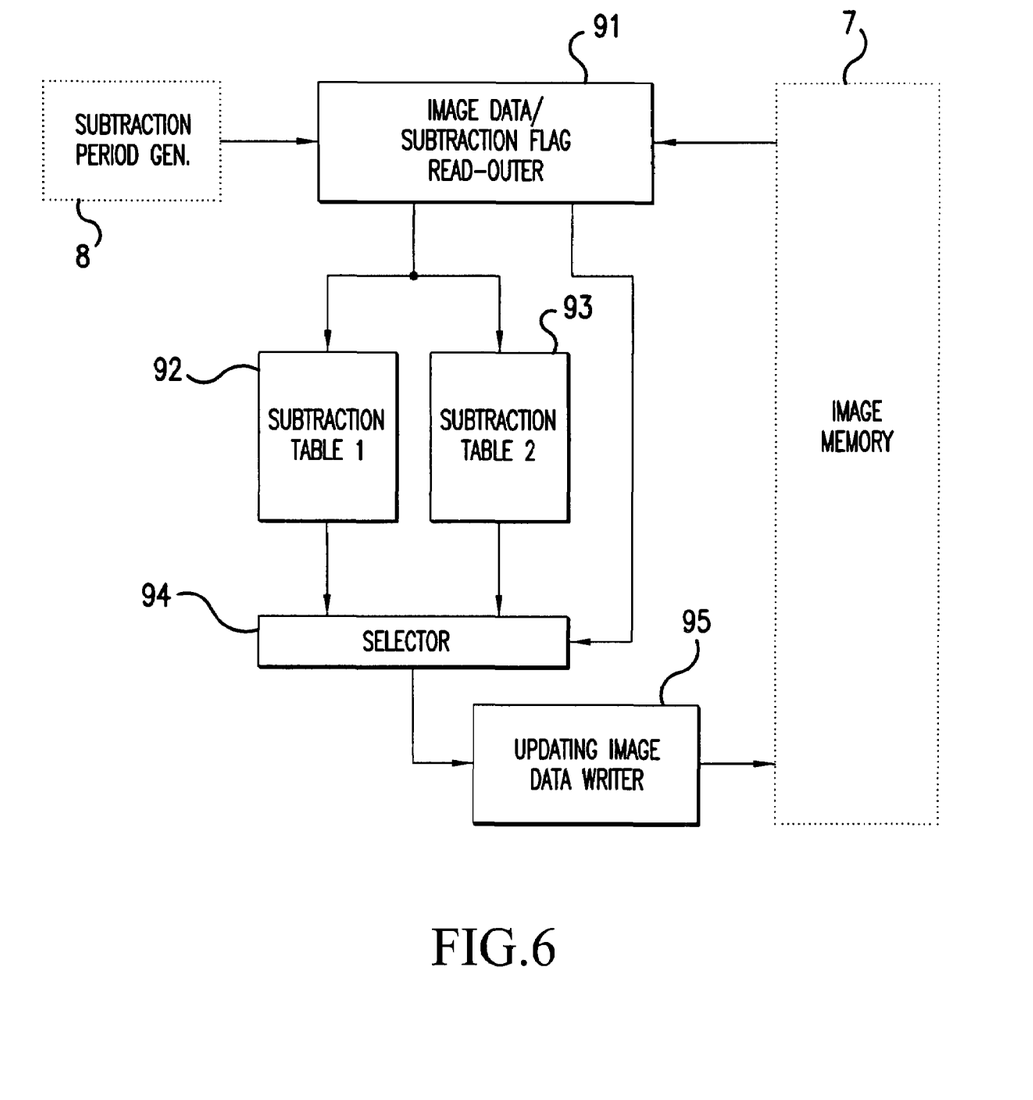
FIG. 6 is a block diagram that shows the principal configuration of Subtraction Processor 9.

Subtraction Processor 9 has the configuration shown in FIG. 6. FIG. 6 is a block diagram that shows the principal configuration of Subtraction Processor 9.

Image Data/Subtraction Flag Read-Outer 91 of subtraction Processor 9, in synchronization with the subtraction trigger from Subtraction Period Generator 8, reads out echo data that has been stored in the pixels of the image memory, i.e. image data, and corresponding subtraction flags. Reading out from Image Memory 7 is performed according to a rectangular coordinate system.

Image Data/Subtraction Flag Read-Outer 91 provides the image data that has been read out to Subtraction Tables 92 and 93, and provides subtraction flags to Selector 94.

Figure 7:
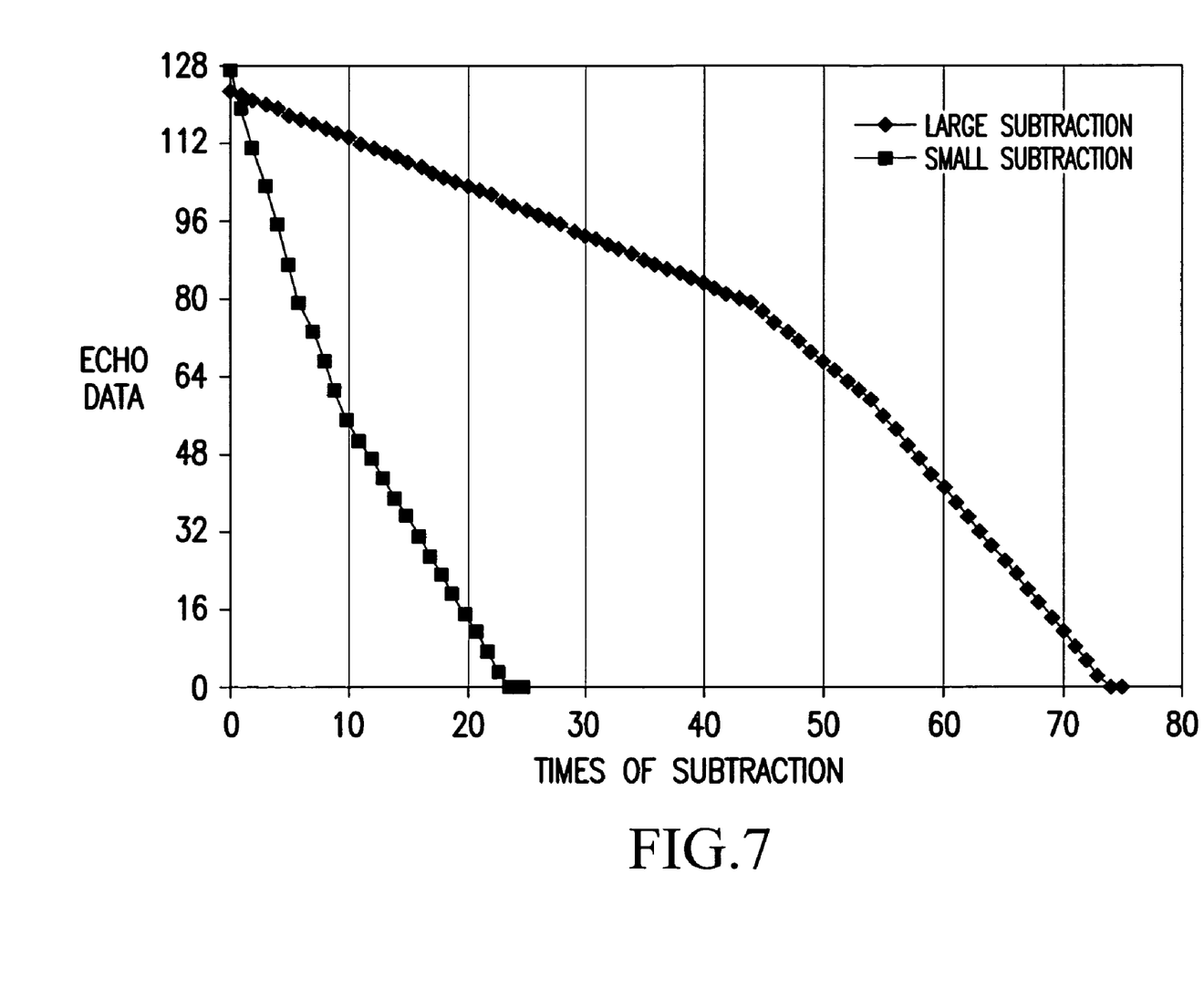
FIG. 7 shows transitions in data levels when subtraction processing has been performed with Subtraction Tables 92 and 93.

Subtraction Tables 92 and 93 perform subtraction processing for each subtraction period, with each of the tables performing a different amount of subtraction as shown in FIG. 7, and then output the image data after subtraction processing to Selector 94.

FIG. 7 shows transitions in data levels when subtraction processing has been performed with Subtraction Tables 92 and 93. "Subtraction amount—large" indicates a case in which subtraction processing was performed with Subtraction Table 92, and "subtraction amount—small" indicates a case in which subtraction processing was performed with Subtraction Table 93.

In this manner, when subtraction processing has been performed using Subtraction Table 92, the amount of subtraction is large, i.e., the data level quickly becomes low. On the other hand, when subtraction processing has been performed using Subtraction Table 93, the amount of subtraction is small, i.e., the data level slowly becomes low.

Also note that when expressing Subtraction Tables 92 and 93 with an arithmetical expression, where $\alpha$ and $\beta \leq 1$, $\alpha < \beta$, Xn is a present value and Yn is an updated value, Subtraction Table 92 may be expressed as $Yn = \alpha Xn$, and Subtraction Table 93 may be expressed as $Yn = \beta Xn$. Also, the actual subtraction processing may be performed using this sort of an arithmetical expression, or may be performed using a subtraction table that has been stored in advance based on this arithmetical expression.

Selector 94, according to the subtraction flag that has been provided, outputs the image data that has been output from Subtraction table 92 when the subtraction flag is "0", and outputs the image data that has been output from Subtraction table 93 when the subtraction flag is "1". The image data that has been output is input to Updating Image Data Writer 95.

Updating Image Data Writer 95 overwrites the image data input from Selector 94 on the address read out from Image Memory 7. Note that here as well, the overwrite processing is performed using a rectangular coordinate system, same as the reading out from Image Memory 7.

By performing this sort of processing, it is possible to update the image data with a subtraction amount corresponding to the subtraction flag. In other words, the image data is slowly attenuated when the subtraction flag is "1" as for an object, and the image data is quickly attenuated when the subtraction flag is "0" as for interference or white noise.

Display Read-Outer 10, according to a display timing provided from Display 11, sequentially reads out the image data of the pixels of Image Memory 7, and provides Display 11 with light emission intensity information and color information corresponding to the data level of the obtained image data.

Display 11 is configured using a CRT or LCD, and emits light and color according to the provided light emission intensity information and color information.

By using this sort of configuration and processing, the amount of light emitted is gradually attenuated at a low attenuation amount for an object, which is an element required to be displayed, and the amount of light emitted is quickly attenuated at a high attenuation amount for interference or white noise, which are elements not required to be displayed. Thus, the object is more easily visible to an operator than interference or white noise, so the visibility of the object improves.

Also, in the foregoing description, an example having two types of subtraction tables was given, but the number of subtraction tables is not limited to two, and may be appropriately set according to application. In this case, the subtraction flag as well may be provided with not one bit as described above, but a plurality of bits, according to the number of subtraction tables.

Also, in the foregoing description, an example was given in which either of consecutiveness and continuity may be satisfied, but a judgment may also be performed based on only consecutiveness or only continuity.

Also, in the foregoing description, in the judgment of consecutiveness, an area of nine echo data points (Consecutiveness Determination Reference Region 110), centered on the echo data point to be judged and including that echo data point and the surrounding eight echo data points, was used, but this area also can be set as appropriate. Here, by setting such that the number of echo data points in the heading direction is greater than the number of echo data points in the distance direction, the consecutiveness judgment is less likely to be affected by interference. Thus, it is possible to more reliably distinguish between an object and a disturbance.

What is claimed is:

1. A radar apparatus comprising:
    a data receptor which is configured to sequentially receive reception data of a polar coordinate system obtained by rotation of a sweep;
    an image data storage which is configured to convert the reception data of the polar coordinate system to image data of a rectangular coordinate system, and to store the image data such that all of the image data is updated according to the reception data for each rotation of the sweep;
    a subtraction characteristic determinator which is configured to, based on at least one of the planar consecutiveness or the time-wise continuity of the points of reception data obtained by the data receptor, determine a subtraction characteristic with which a data level of the corresponding image data is reduced at each of a subtraction timing that is shorter than the period of one rotation of the sweep;
    an image data subtractor which is configured to, based on the subtraction characteristic, reduce the data level of the image data that has been written to the image data storage at each subtraction timing, and to store the updated image data in the image data storage; and
    a display which is configured to successively read out and display the image data that has been stored in the image data storage.

2. The radar apparatus as set forth in claim 1, wherein
    the subtraction characteristic determinator acquires the data level of a planar reception data point group comprising a region of a predetermined number of data points in a distance direction and a heading direction centered around a reception data point for which a subtraction characteristic is to be determined, and
    when the subtraction characteristic determinator detects, in the planar reception data point group, that a number of reception data points, having the data level being equal to or greater than a predetermined threshold value, is equal to or greater than a predetermined number of reception data points,
    the subtraction characteristic determinator sets a subtraction characteristic such that, with the reception data point for which a subtraction characteristic is to be determined having planar consecutiveness, the rate of change over time of the data level due to subtraction at each subtraction timing of the image data corresponding to the reception data is low.

3. The radar apparatus as set forth in claim 1, wherein the subtraction characteristic determinator is provided with a past reception data storage that stores reception data for a past predetermined number of sweep rotations; and
    the subtraction characteristic determinator acquires the data level of a time-wise reception data point group comprising a reception data point for which a subtraction characteristic is to be determined and the reception data points of the past predetermined number of sweep rotations corresponding to the reception data point for which a subtraction characteristic is to be determined, and
    when the subtraction characteristic determinator detects, in the time-wise reception data point group, that a number of reception data points, having the data level being equal to or greater than a predetermined threshold value, is equal to or greater than a predetermined number of reception data points,
    the subtraction characteristic determinator sets a subtraction characteristic such that, with the reception data point for which a subtraction characteristic is to be determined having time-wise continuity, the rate of change over time of the data level due to subtraction at each subtraction timing of the image data corresponding to the reception data is low.

4. The radar apparatus as set forth in claim 2, wherein the subtraction characteristic determinator is provided with a past reception data storage that stores reception data for a past predetermined number of sweep rotations; and
    the subtraction characteristic determinator acquires the data level of a time-wise reception data point group comprising a reception data point for which a subtraction characteristic is to be determined and the reception data points of the past predetermined number of sweep rotations corresponding to the reception data point for which a subtraction characteristic is to be determined, and
    when the subtraction characteristic determinator detects, in the time-wise reception data point group, that a number of reception data points, having the data level being equal to or greater than a predetermined threshold value, is equal to or greater than a predetermined number of data points, or when the subtraction characteristic determinator detects, in the planar reception data point group, that a number of reception data points, having the data level being equal to or greater than a predetermined threshold value, is equal to or greater than a predetermined number of data points, the subtraction characteristic determinator sets a subtraction characteristic such that, with the reception data point for which a subtraction characteristic is to be determined having at least one of time-wise continuity and planar consecutiveness, the rate of change over time of the data level due to subtraction at each subtraction timing of the image data corresponding to the reception data is low.

5. The radar apparatus as set forth in claim 2, wherein the image data subtractor is provided with a subtraction characteristic such that the rate of change over time is high and a subtraction characteristic such that the rate of change over time is low, and the subtraction characteristic determinator, when the number of reception data points, having the data level being equal to or greater than a predetermined threshold value, is equal to or greater than a predetermined number of data points, causes the image data subtractor to select the subtraction characteristic such that the rate of change over time is low.

6. The radar apparatus as set forth in claim 3, wherein the image data subtractor is provided with a subtraction characteristic such that the rate of change over time is high and a subtraction characteristic such that the rate of change over time is low, and the subtraction characteristic determinator, when the number of reception data points, having the data level being equal to or greater than a predetermined threshold value, is equal to or greater than a predetermined number of data points, causes the image data subtractor to select the subtraction characteristic such that the rate of change over time is low.

7. The radar apparatus as set forth in claim 4, wherein the image data subtractor is provided with a subtraction characteristic such that the rate of change over time is high and a subtraction characteristic such that the rate of change over time is low, and the subtraction characteristic determinator, when the number of reception data points, having the data level being equal to or greater than a predetermined threshold value, is equal to or greater than a predetermined number of data points, causes the image data subtractor to select the subtraction characteristic such that the rate of change over time is low.

* * * * *